(12) United States Patent
Jakob et al.

(10) Patent No.: US 7,041,267 B2
(45) Date of Patent: May 9, 2006

(54) GRANULAR SODIUM CARBONATE OBTAINED BY FLUID-BED SPRAY GRANULATION AND A PROCESS FOR ITS PRODUCTION

(75) Inventors: Harald Jakob, Hasselroth (DE); Birgit Bertsch-Frank, Wuppertal (DE)

(73) Assignee: Degussa AG, Dusseldorf (DE)

( * ) Notice: Subject to any disclaimer, the term of this patent is extended or adjusted under 35 U.S.C. 154(b) by 109 days.

(21) Appl. No.: 09/961,395

(22) Filed: Sep. 25, 2001

(65) Prior Publication Data

US 2002/0041843 A1    Apr. 11, 2002

(30) Foreign Application Priority Data

Sep. 29, 2000    (DE) ................................ 100 48 514

(51) Int. Cl.
*C01B 15/10*    (2006.01)
(52) U.S. Cl. ................... 423/415.2; 423/186; 423/190; 423/266; 423/275
(58) Field of Classification Search ............. 423/415.2, 423/421, 426, 186, 190, 265, 266, 275
See application file for complete search history.

(56) References Cited

U.S. PATENT DOCUMENTS

| | | | |
|---|---|---|---|
| 3,951,838 A | | 4/1976 | Jayawant et al. |
| 4,118,466 A | | 10/1978 | Klebe et al. |
| 4,146,571 A | | 3/1979 | Will et al. |
| 4,388,287 A | | 6/1983 | Sugano et al. |
| 4,428,914 A | * | 1/1984 | Brichard et al. ............. 423/265 |
| 5,560,896 A | * | 10/1996 | Bewersdorf et al. ..... 423/415.2 |
| 5,714,201 A | * | 2/1998 | Bewersdorf et al. ........ 427/213 |
| 6,340,452 B1 | | 1/2002 | Bossoutrot et al. |
| 6,413,927 B1 | * | 7/2002 | Horne et al. ................. 510/441 |

FOREIGN PATENT DOCUMENTS

| | | |
|---|---|---|
| DE | 27 33 935 | 2/1978 |
| DE | 26 44 147 | 4/1978 |
| DE | 31 42 574 | 9/1982 |
| DE | 43 29 205 | 3/1995 |
| EP | 0 796 817 | 9/1997 |
| FR | 2 247 533 | 5/1975 |

OTHER PUBLICATIONS

English language abstract of OR above.
English language abstract of PR above.
English language abstract of QR above.
Database WPI, Derwent Publications, XP 002180576.

* cited by examiner

*Primary Examiner*—Stanley S. Silverman
*Assistant Examiner*—Peter J. Lish
(74) *Attorney, Agent, or Firm*—Pillsbury Winthrop Shaw Pittman, LLP

(57) ABSTRACT

The invention relates to a process for the production, by fluid-bed spray granulation, of granular sodium percarbonate having a low TAM value. According to the invention, in the fluid-bed spray granulation, an Mg compound in a quantity of 50 to 2,000 ppm, in particular 100 to 1,000 ppm, or/and a complexing agent from among the hydroxycarboxylic acids, aminocarboxylic acids, aminophosphonic acids and phosphonocarboxylic acids, hydroxyphosphonic acids and their alkali metal salts, ammonium salts or Mg salts, in a quantity of 50 to 2,000 ppm, in particular 200 to 1,000 ppm, are added as stabilisers to the soda solution and/or $H_2O_2$ solution. Preferably a combination of an Mg compound in a quantity of 100 to 1,000 ppm $Mg^{2+}$ and waterglass in a quantity of 0.1 to 1 wt. %, in particular 0.1 to 0.5 wt. %, is used, and in this case granules having a TAM value of about or below 6 $\mu W/g$ and simultaneously a short dissolving time, are obtainable.

18 Claims, No Drawings

GRANULAR SODIUM CARBONATE OBTAINED BY FLUID-BED SPRAY GRANULATION AND A PROCESS FOR ITS PRODUCTION

Priority is claimed to German patent application no. 100 48 514.6, filed on Sep. 29, 2000, which is incorporated herein by reference in its entirety.

DESCRIPTION

This invention relates to granular sodium percarbonate having a low TAM value (microcalorimetric determination of the energy release during storage, determined by means of TAM® Thermal Activity Monitor manufactured by the firm of Thermometric AB, Järfälla (SE)), in particular a TAM value of below 8 µW/g, wherein the grain of sodium percarbonate has a structure of the kind which is obtainable by a fluid-bed spray granulation and one or more stabilisers are substantially evenly distributed in the grain. The invention also relates to a process for producing the granular sodium percarbonate according to the invention, wherein an aqueous hydrogen peroxide solution and aqueous soda solution or soda suspension together with one or more stabilisers are sprayed into a fluid bed formed from sodium percarbonate particles and at the same time water is evaporated out of the fluid bed.

Crystallisation processes and so-called fluid-bed spray granulation processes in particular are used on a large scale for the production of sodium percarbonate corresponding to the general formula $2\ Na_2CO_3.3\ H_2O_2$, which is used as the bleaching component in detergents and cleaning agents. In the crystallisation processes—reference may be made, for example, to U.S. Pat. No. 4,146,571—hydrogen peroxide and soda are reacted in a mother liquor containing common salt. To control the crystallisation and improve the stability of the sodium percarbonate, magnesium ions in a quantity of 0.2 to 2 wt. % are introduced at the same time as the hydrogen peroxide solution. 0.5 to 3 wt. % sodium hexametaphosphate is also added to the system. The sodium percarbonate thus obtained per se can be stored satisfactorily and has a low TAM value, but the active oxygen stability of the crystallisate in the presence of constituents of detergents, such as zeolites in particular, is unsatisfactory owing to the irregular surface and the not very dense structure. Sodium percarbonate which has been produced by a crystallisation process can be made more stable in storage in the presence of constituents of detergents by coating the grain of sodium percarbonate with stabilising components, such as sodium sulfate and other hydrate-forming substances, but the demands which are nowadays placed on such a product are frequently no longer adequately met.

In the crystallisation process for producing sodium percarbonate described in DE-PS 26 44 147, waterglass is used concomitantly in addition to a magnesium salt and sodium hexametaphosphate. The impurities in the mother liquor which result from the crystallisation are adsorbed onto the magnesium silicate during the precipitation of the latter and are separated off by filtration of the mother liquor prior to its reuse. However, the above-mentioned disadvantages still remain.

The fluid-bed spray granulation process yields substantially spherical, dense sodium percarbonate particles which have a shell-like structure owing to the production conditions and a greater stability in storage than that of a product obtained by crystallisation. The process is carried out by spraying an aqueous hydrogen peroxide solution and an aqueous soda solution or optionally soda suspension into a fluid bed containing sodium percarbonate particles whose diameters are smaller than those of the particles being produced. During the spraying in of the coreactants in aqueous medium, water is evaporated off at a fluid-bed temperature within the range of 40 to 95° C.

In the fluid-bed spray granulation process according to DE-OS 27 33 935, the hydrogen peroxide solution and soda solution are mixed immediately prior to being sprayed. A condensed alkali metal phosphate or ammonium phosphate has to be added in order to avoid a premature crystallisation inside the nozzle. In addition, stabilisers such as magnesium sulfate may be added to the hydrogen peroxide solution and/or sodium silicate to the sodium carbonate solution. However, the addition of the above-mentioned stabilisers is not considered to be essential. The quantity of magnesium sulfate given in the Example results in a magnesium content of more than 1 g per kg of sodium percarbonate.

In the fluid-bed spray granulation process for producing granular sodium percarbonate according to DE-PS 43 29 205, the requirement to introduce a condensed phosphate is avoided by using a specially shaped three-component nozzle with external mixing of the solutions containing the coreactants. Again in this process, stability-enhancing additives, such as magnesium salts, waterglass, complexing agents, stannates and dipicolinic acid may be added to the solutions to be sprayed. No idea of the quantity of additives required, of the selection of the type of complexing agents nor of possible combinations of different stabilisers can be inferred from this document.

For reasons of safety in handling, in particular an increased safety during the storage of sodium percarbonate in a silo, there is nowadays an increasing demand for sodium percarbonate having a further improved storability, corresponding to a decreased TAM value compared with the prevailing values. The TAM value of sodium percarbonate can to a certain extent be improved, that is, lowered, by coating the sodium percarbonate with a material which renders it inert, but the effect thereby achievable is in many cases still inadequate. In the process according to DE-OS 27 33 935, a low TAM value is obtained using the quantity of a condensed phosphate and of magnesium sulfate given in the Example, but the quantity of stabilisers required is very high.

Accordingly, the object of the present invention is to demonstrate another process for producing granular sodium percarbonate by fluid-bed spray granulation, whereby granular sodium percarbonate having as low a TAM value as possible can be obtained using as low a quantity as possible of one or more stabilisers. A further object is that, at the best possible stabilisation and hence low TAM value, the rate of dissolution of the sodium percarbonate should at the same time not be decreased, but rather increased.

These and other objects, which may be derived from the description below, are achieved by the process according to the invention.

Accordingly, a process for producing granular sodium percarbonate by fluid-bed spray granulation has been found, wherein an aqueous sodium carbonate solution or sodium carbonate suspension and an aqueous hydrogen peroxide solution in the presence of at least one stability-enhancing additive is sprayed into a fluid bed containing sodium percarbonate particles and at the same time water is evaporated at a fluid-bed temperature within the range of 40 to 95° C., which is characterised in that the additive used is a magnesium compound in a quantity of 50 to 2,000 ppm $Mg^{2+}$ and/or a chelate complexing agent from among the hydroxycarboxylic acids, aminocarboxylic acids, aminophosphonic acids, phosphonocarboxylic acids, hydroxyphosphonic acids and the alkali metal salts, ammonium salts or magnesium salts of the above-mentioned acids, in a quantity of 50 to 2,000 ppm, the quantity used in each case being based on the sodium percarbonate to be produced and a combination of a magnesium salt and a condensed phosphate being excepted. The subclaims are directed to preferred embodiments of the process according to the invention.

Of the magnesium compounds used as stabilisers, water-soluble compounds are preferred, for example, magnesium sulfate, magnesium chloride and magnesium acetate. It is particularly advantageous to employ magnesium salts of chelate complexing agents from among the hydroxycarboxylic acids, aminocarboxylic acids, aminophosphonic acids, phosphonocarboxylic acids and hydroxyphosphonic acids. Because they contain both magnesium and complexing agent, such salts act synergistically. In a preferred embodiment, magnesium compounds are used in a quantity corresponding to 100 to 1000 ppm (ppm=parts per million) $Mg^{2+}$ and particularly preferably 100 to 500 and in particular 200 to 250 ppm $Mg^{2+}$. In the carrying out of the process, it is useful to add the magnesium compound to the hydrogen peroxide solution to be sprayed.

The chelate complexing agents used according to the invention are compounds selected from among nitrilotriacetic acid, iminodiacetic acid, ethylenediaminetetraacetic acid, iminodisuccinate, tartaric acid, gluconic acid, aminotri(methylene)phosphonic acid, ethylenediaminetetra(methylene)phosphonic acid, diethylenetriaminepenta(methylene)phosphonic acid, tri-, tetra-, penta- and hexamethylenetetra(methylene)phosphonic acid and 1-hydroxyethane-1,1-diphosphonic acid and their water-soluble salts, in particular sodium salts, ammonium salts and magnesium salts. The quantity of the chelate complexing agents used is preferably within the range of 100 to 1,000 ppm, in particular 200 to 1,000 ppm. In another preferred embodiment, the chelate complexing agents or their salts are added to the soda solution or soda suspension to be sprayed.

For the purpose of stabilisation, it is preferable also to add waterglass to the soda solution or soda suspension to be sprayed. Waterglass is generally used in a quantity of about 1 wt. % $SiO_2$, based on sodium percarbonate. A disadvantage of using too large a quantity of waterglass is that the rate of dissolution of the sodium percarbonate decreases. The experts are interested in lowering the $SiO_2$ content to values of significantly below 1 wt. %, based on sodium percarbonate, in order to minimise this disadvantage. By using one or more of the stabilising additives to be employed according to the invention and in addition waterglass, it is possible to lower the $SiO_2$ content to values of about or below 0.5 wt. % $SiO_2$, even 0.1 wt. % $SiO_2$.

The steps for carrying out the fluid-bed spray granulation process for producing sodium percarbonate are known to the experts—by way of example, reference is made to DE-OS 27 33 935 and DE-OS 43 29 205, whose disclosures are included in the present Description.

In a preferred embodiment of the process, a 30 to 75 wt. % hydrogen peroxide solution and a 20 to 60 wt. %, preferably 30 to 50 wt. % soda solution or soda suspension is sprayed into a fluid bed containing sodium percarbonate particles. At least one of these solutions or the suspension contains an effective concentration of at least one stabilising additive to be used according to the invention; preferably a synergistically effective combination of stabilisers is used. Particularly preferably the two solutions, or solution and suspension, are sprayed into the fluid bed using a three-component or four-component atomising nozzle with external mixing of the solutions. The above-mentioned nozzles comprise a central pipe and two or three jacketed pipes disposed around it, with the central pipe extending beyond the jacketed pipes by 2 to 10 times the radius of the central pipe. In the case of the three-component nozzle, the $H_2O_2$ solution is preferably passed through the central pipe and the soda solution or soda suspension through an adjacent jacketed pipe; a spraying gas for spraying the solutions is led through the outer jacketed pipe. In the case of the embodiment using a four-component atomising nozzle, spraying gas is preferably led through the jacketed pipe adjacent to the central pipe as well as through the outermost jacketed pipe; the two solutions are mixed externally as a result of this arrangement and at the same time a microclimate is produced. In view of the limited stability of sodium percarbonate, it is advisable to maintain the temperature of the fluid bed within the range of 50 to 70° C. during the spraying of the two solutions or of the $H_2O_2$ solution and soda suspension.

In a preferred embodiment, the fluid-bed spray granulation is carried out in a continuously operated fluid-bed apparatus with nucleation in the reactor or introduction of nuclei and classifying discharge of the granular material.

To increase the stability in storage of sodium percarbonate in the presence of constituents of detergents, such as zeolites in particular, it is advisable to coat the granular sodium percarbonate obtainable according to the invention with one or more layers subsequent to its formation. Here one can use the processes for coating sodium percarbonate known to the experts. The coating components are predominantly compounds which can themselves form hydrates, such as sodium sulfate, magnesium sulfate, sodium carbonate and sodium bicarbonate, borates and perborates. In many cases waterglass is additionally used as a component in a coating containing several components. In a particularly preferred embodiment, the coating consists substantially of sodium sulfate and its hydrates.

The invention also provides granular sodium percarbonate obtainable by the process according to the invention. The sodium percarbonate particles are substantially spherical and have a layered grain structure, as is typical for a fluid-bed spray granulation. The product contains, substantially evenly distributed in the grain, magnesium salt in a quantity within the range of 50 to 2,000 ppm $Mg^{2+}$, preferably 100 to 1000 ppm and in particular 200 to 500 ppm $Mg^{2+}$, and/or one or more chelate complexing agents, of the type previously disclosed, in a quantity of 50 to 2,000 ppm, in particular 200 to 1,000 ppm, but not a combination of a magnesium salt and a condensed phosphate. The products are further characterised in that they have a TAM value of equal to or less than 8 µW/g, in particular less than 7 µW/g, and particularly preferably about 4 to 6 µW/g. The given TAM values refer to a measurement by means of the Thermal-Activity-Monitor manufactured by the firm of Thermometric AB, Spjutvägen 5a, S-175 61 Jäfälla; the measured values given are those found after storage in the measuring cuvette for 48 h at 40° C. Preferably the product contains in addition waterglass having an $SiO_2/Na_2O$ module of 1 to 3 in a quantity within the range of 0.1 to 0.5 wt. %. A combination of $Mg^{2+}$ and $SiO_2$ enables low TAM values and, simultaneously, short dissolving times to be achieved even with a low input of $SiO_2$.

The advantages of the invention are that granular sodium percarbonate having a low TAM value can be obtained by a known fluid-bed spray granulation process through the use of stabilising additives and combinations of additives according to the invention. Owing to the low TAM value, it is possible to store sodium percarbonate in large quantities without creating a safety hazard. The selection of stabilising additives according to the invention additionally makes it possible to provide products which dissolve more rapidly than do many commercially available products having a silica content of about 1 wt. %. The following Examples illustrate the invention.

EXAMPLES

General instructions for procedure:

A 43 wt. % aqueous hydrogen peroxide solution and a 30 wt. % soda solution were sprayed by means of a three-component atomising nozzle into a laboratory apparatus for fluid-bed spray granulation, after fluidisation of sodium percarbonate placed therein. The apparatus was equipped with devices for dust recycling and introduction of nuclei as well as a classifying discharge. The spray rates were: 3.42 kg/h $H_2O_2$ solution and 9.54 kg/h soda solution. In each case magnesium sulfate was used as magnesium salt and added to the $H_2O_2$ solution. The chelate complexing agents used were added to the soda solution. Waterglass containing a module in the range of 1.8 to 2 ($SiO_2/Na_2O$) was added to the soda solution to be sprayed, in order to adjust the $SiO_2$ content of the sodium percarbonate. The tests using different stabilising additives and combinations of additives as well as different quantities of additives, in each case based on the sodium percarbonate to be prepared, and the resulting TAM values, determined after 48 h at 40° C., may be seen in Tables 1 and 2 below. From these tests, it follows that the $SiO_2$ content can be decreased by the addition of magnesium sulfate, so that products which have a low TAM value—about 5 μW/g—and at the same time a high rate of dissolution are obtained.

As the tests represented in Table 3 show, the dissolving time of the sodium percarbonate decreases surprisingly sharply with an increasing quantity of $Mg^{2+}$ at a constant, low $SiO_2$ content (here 0.1 wt. %).

Through the combination of magnesium with a chelate complexing agent, not only are products having a low TAM value obtained, but operational disturbances owing to precipitation of insoluble magnesium salts are at the same time avoided.

Whereas the use of chelate completing agents according to the invention leads to a lowering of the TAM value, other known stabilisers for active oxygen compounds, such as dipicolinic acid, have proved to be scarcely effective as regards a lowering of the TAM value.

Determination of the dissolving time:—The dissolving time is the time in which 95% of 2 g of the sodium perborate sample used is dissolved per 1 of water at 15° C. This time is measured from the change in the electrical conductivity. A thermostatted glass measuring cell (D:=90 mm, $H_1$=150 mm) is used for the determination. During the determination, the solution is stirred using a 4-blade stirrer at 340±5 revolutions per minute.

TABLE 1

TAM values (40° C./48 h) in relation to the quantity (ppm) of $Mg^{2+}$ and/or $SiO_2$

| Example No. | $Mg^{2+}$ (ppm) | $SiO_2$ (%) | Start $O_a$ (%) | TAM 40° C./48 h |
|---|---|---|---|---|
| 1 **) | — | 0.5 | 14.1 | 9.3 |
| 2 **) | 25 | 0.5 | 13.9 | 8.4 |
| 3 **) | — | 1.0 | 14.0 | 7.6 |
| 4 | 250 | 0.25 | 13.9 | 7.2 |
| 5 | 250 | 0.5 | 14.2 | 5.7 |
| 6 | 250 | 0.88 | 14.0 | 4.9 |
| 7 | 1000 | 0.5 | 13.6 | 3.4 |
| 8 | 480 | 0.25 | 13.69 | 5.7 |
| 9 | Product of Example 6 coated with 5 wt. % $Na_2SO_4$ | | 13.3 | 4.2 |

**) = not according to the invention

TABLE 2

TAM values (40° C./48 h) in relation to the type and quantity (ppm) of stabilising additives

| Example No. | Chelate complexing agent *); quantity (ppm) | $SiO_2$ (%) | Start $O_a$ (%) | TAM 40° C./48 h |
|---|---|---|---|---|
| 10 | ATMP; 1000 | 0.5 | 14.2 | 5.3 |
| 11 | HEDP; 1000 | 0.5 | 13.9 | 7.3 |
| 12 | ATMP-$Na_5$; 1000 | 0.5 | 13.85 | 5.3 |
| 13 | IDS; 1000 | 0.5 | 13.84 | 6.3 |
| 14 | $Na_7$-DTPMP; 1000 | 0.5 | 13.83 | 6.1 |
| 15 | DTPMP; 1000 | 0.5 | 13.99 | 5.0 |
| 16 | EDPTP; 1000 | 0.5 | 13.96 | 5.1 |
| 17 | EDTA; 1000 | 0.5 | 13.64 | 5.3 |
| 18 | Gluconic acid; 1000 | 0.5 | 13.98 | 7.2 |

*) ATMP = Aminotri(methylene)phosphonic acid
$Na_5$-ATMP = Penta-Na salt of ATMP
HEDP = 1-Hydroxyethane-1,1-diphosphonic acid
IDS = Iminodisuccinate
DTPMP = Diethylenetriaminepenta(methylene)phosphonic acid
$Na_7$-DTPMP = Hepta-Na salt of DTPMP
EPTMP = Ethylenediaminetetra(methylene)phosphonic acid
EDTA = Ethylenediaminetetraacetic acid

TABLE 3

TAM value and dissolving time in relation to the quantity of $Mg^{2+}$ introduced at a given $SiO_2$ content

| Example No. | $Mg^{2+}$ (ppm) | $SiO_2$ (%) | TAM value | Dissolving time (min/g) |
|---|---|---|---|---|
| 19 | 125 | 0.1 | 10.4 | 1.4 |
| 20 | 250 | 0.1 | 9.3 | 1.1 |
| 21 | 500 | 0.1 | 6.3 | 0.8 |

The invention claimed is:

1. A process for the production of granular sodium percarbonate by fluid-bed spray granulation, the process comprising:
   (a) spraying
      (i) an aqueous sodium carbonate solution or sodium carbonate suspension,
      (ii) an aqueous hydrogen peroxide solution, and
      (iii) at least one stability-enhancing additive into a fluid bed containing sodium percarbonate particles; and (b) evaporating water at the same time as a temperature of from 40° C. to 95° C., wherein the additive is
  (i) a magnesium compound in an amount of from 125–1000 ppm $Mg^{2+}$ and
  (ii) waterglass having an $SiO_2/Na_2O$ module of from 1 to 3 in an amount corresponding to 0.1 wt. % to 1 wt. % $SiO_2$;
wherein the quantity of the magnesium compound and waterglass are based on the sodium percarbonate to be produced, and wherein the additive does not contain a magnesium salt in combination with a condensed phosphate.

2. The process according to claim 1, wherein the magnesium compound is a magnesium sulfate, a magnesium acetate, or a magnesium salt of a chelate complexing agent.

3. The process according to claim 1, wherein the magnesium compound is added to the aqueous hydrogen peroxide solution.

4. The process of claim 1, wherein the $SiO_2/Na_2O$ module is from 1 to 2.

5. The process of claim 1, wherein the amount of waterglass corresponds to 0.1 wt. % to 0.5 wt. % $SiO_2$.

6. The process according to claim 1, wherein the spraying comprises using a three-component or four-component atomising nozzle with external mixing, the nozzle further comprising a central pipe with two or three jacketed pipes disposed around it, wherein the central pipe extends beyond the jacketed pipes by 2 to 10 times a radius of the central pipe.

7. The process of claim 6, wherein the aqueous sodium carbonate solution or sodium carbonate suspension has a sodium carbonate content of from 20 wt. % to 60 wt. % and the aqueous hydrogen peroxide solution has a concentration of from 30 wt. % to 75 wt. %.

8. The process of claim 7, wherein the aqueous sodium carbonate solution or sodium carbonate suspension has a sodium carbonate content of from 30 wt. % to 50 wt. %.

9. The process of claim 1, wherein the additive further comprises 50 to 2000 ppm of a chelate complexing agent selected from the group consisting of hydroxycarboxylic acids, aminocarboxylic acids, aminophosphonic acids, phosphonocarboxylic acids, hydroxyphosphonic acids, alkali metal salts thereof, ammonium salts thereof, and magnesium salts thereof; wherein the quantity of chelate complexing agent is based on the sodium percarbonate to be produced.

10. The process according to claim 9, wherein the complexing agent is selected from the group consisting of nitrilotriacetic acid, iminodiacetic acid, ethylenediaminetetraacetic acid, iminodisuccinate, tartaric acid, gluconic acid, aminotri(methylene)phosphonic acid, ethylenediaminetetra(methylene)phosphonic acid, diethylenetriaminepenta(methylene)phosphonic acid, trimethlenetetra(methylene)phosphonic acid, tetramethylenetetra(methylene)phosphonic acid, pentamethylenetetra(methylene)phosphonic acid, hexamethylenetetra(methylene)phosphonic acid, 1-hydroxyethane-1,1-diphosphonic acid, sodium salts thereof, potassium salts thereof, and magnesium salts thereof.

11. The process according to claim 9, wherein 100 ppm to 1000 ppm of the complexing agent is added to any one of rho aqueous hydrogen peroxide solution, the aqueous sodium carbonate solution, or the sodium carbonate suspension.

12. The process according to claim 11, wherein 200 ppm to 1000 ppm of the chelate complexing agent is added.

13. Granular sodium percarbonate comprising
  (i) a grain structure obtainable by fluid-bed spray granulation,
  (ii) a magnesium compound in an amount of 125 ppm to 1000 ppm $Mg^{2+}$ substantially evenly distributed in the grain and,
  (iii) waterglass in an amount corresponding to 0.1 wt. % to 1 wt. % $SiO_2$ substantially evenly distributed in the grain; and
wherein the sodium percarbonate does not contain a magnesium salt in combination with a condensed phosphate, and wherein the granular sodium percarbonate has a TAM value of equal to or less than 8 µW/g measured after 48 hours at 40° C.

14. The granular sodium percarbonate according to claim 13, further comprising a single-layer or multilayer stabilising coating consisting of one or more hydrate-forming salts.

15. The granular sodium percarbonate of claim 13, wherein the amount of waterglass corresponds to 0.1 wt. % to 0.5 wt. % $SiO_2$.

16. The granular sodium percarbonate of claim 13, additionally comprising 50 to 2000 ppm of a chelate complexing agent selected from the group consisting of hydroxycarboxylic acids, aminocarboxylic acids, aminophosphonic acids, phosphonocarboxylic acids, hydroxyphosphonic acids, alkali metal salts thereof, ammonium salts thereof, and magnesium salts thereof.

17. The granular sodium percarbonate of claim 13, wherein the TAM value is less than 7 µW/g.

18. The granular sodium percarbonate of claim 17, wherein the TAM value is from 4 µW/g to 6 µW/g.

* * * * *

UNITED STATES PATENT AND TRADEMARK OFFICE
CERTIFICATE OF CORRECTION

PATENT NO. : 7,041,267 B2 Page 1 of 1
APPLICATION NO. : 09/961395
DATED : May 9, 2006
INVENTOR(S) : Harald Jakob et al.

It is certified that error appears in the above-identified patent and that said Letters Patent is hereby corrected as shown below:

On title page, item 54 and column 1, line 1: replace "GRANULAR SODIUM CARBONATE…" with --GRANULAR SODIUM PERCARBONATE…--

Col. 7, line 1 - replace "as a temperature of" with --at a temperature of --.

Col. 8, line 11 - replace "any one of rho aqueous hydrogen peroxide solution" with --any one of the aqueous hydrogen peroxide solution--.

Signed and Sealed this

Fifth Day of September, 2006

JON W. DUDAS
*Director of the United States Patent and Trademark Office*